United States Patent [19]

Klesse et al.

[11] Patent Number: 5,306,743
[45] Date of Patent: Apr. 26, 1994

[54] MULTIPLE PHASE SYNTHETIC RESIN DISPERSION

[75] Inventors: Wolfgang Klesse, Mainz; Gerhard Markert, Ober-Ramstadt; Marliese Weber, Roedermark, all of Fed. Rep. of Germany

[73] Assignee: Röhm GmbH, Darmstadt, Fed. Rep. of Germany

[21] Appl. No.: 683,506

[22] Filed: Apr. 8, 1991

Related U.S. Application Data

[63] Continuation of Ser. No. 447,157, Dec. 7, 1989, abandoned.

[30] Foreign Application Priority Data

Dec. 24, 1988 [DE] Fed. Rep. of Germany ....... 3843965

[51] Int. Cl.$^5$ .............................. C08L 83/00
[52] U.S. Cl. .................... 523/201; 525/902; 524/819; 524/822; 524/823
[58] Field of Search ............ 523/201; 525/902; 524/819, 822, 823

[56] References Cited

U.S. PATENT DOCUMENTS

| | | | |
|---|---|---|---|
| 3,254,044 | 5/1966 | Gunderman et al. | 523/201 |
| 3,657,172 | 4/1972 | Gallagher et al. | 523/201 |
| 4,156,669 | 5/1979 | Lee | 523/201 |

FOREIGN PATENT DOCUMENTS

| | | | |
|---|---|---|---|
| 0227385 | 7/1987 | European Pat. Off. | 523/201 |
| 0242235 | 10/1987 | European Pat. Off. | |
| 0332011 | 9/1989 | European Pat. Off. | |
| 2324660 | 4/1977 | France | |

OTHER PUBLICATIONS

Odian, George, "Principles of Polymerization," McGraw Hill Book Co., New York 1970, pp. 279–284.
Patent Abstracts of Japan, 8 (283) JP-A 59-154133.
Chemical Abstracts 102, 79450c (1985).

*Primary Examiner*—John C. Bleutge
*Assistant Examiner*—Mark Sweet

[57] ABSTRACT

Aqueous synthetic resin dispersions comprising latex particles having an average particle diameter below 140 nanometers, consisting of a) 5 to 45 weight percent of a core material having a dynamic glass transition temperature above 60° C. and b) 95 to 55 weight percent of a shell material having a dynamic glass transition temperature below 80° C., whereby the dynamic glass transition temperature of the shell is at least 20 K. below that of the core, which dispersions have a low minimum film forming temperature and give films of low tackiness and high block point.

9 Claims, No Drawings

MULTIPLE PHASE SYNTHETIC RESIN DISPERSION

This application is a continuation of application Ser. No. 07/447,157, filed Dec. 7, 1989, now abandoned.

The present invention relates to aqueous synthetic resin dispersions which contain latex particles having a hard core material and a relatively soft shell material.

STATE OF THE ART

Latices are known, the latex particles of which are composed of a core material and a shell material enclosing the core. Mostly they have a soft core and a hard shell which, for example, permits recovery of the polymer in powder form.

Emulsion polymers are also known from FR-A 2 324 660, the latex particles of which are composed of a harder core material and a soft shell material. They are used as processing additives for PVC.

In "IUPAC Macromolecular Symposium" No. 28 (1982), p. 600 ff., F. L. Floyd has described multilayer latices having 35-50% polystyrene as core material and 65-50% of a butyl acrylatemethyl methacrylate-styrene-copolymer as the shell material and a more advantageous relationship of hardness and flexibility in films prepared therefrom in comparison with films of copolymers of the same overall composition or of corresponding latex mixtures. The particle size is between 170 and 370 nm.

PROBLEM AND SOLUTION

The problem at the basis of the invention is to provide aqueous synthetic resin dispersions which, despite a low minimum film forming temperature, give films or coatings having a relatively high block point and slight tackiness and hardness sufficient for technical uses. A film is designated in this sense as not tacky if it feels "dry" to the touch and does not adhere to the fingers when grasped. Above all, coatings of such films should not adhere to one another on contact, which is designated as "blocking". Further, the film should, to be sure, show a high extension at break, but at the same time be hard and provide a high resistance to mechanical stress. The last-mentioned properties are indicated by a high E-modulus.

It is known that the film hardness of an emulsion polymer can be adjusted within wide limits by a corresponding choice of the monomer components. Methyl methacrylate arid styrene are the most important among the monomers creating film hardness, while esters of acrylic acid and the higher esters of methacrylic acid promote softness in the films. By a correct choice of the amounts of the two kinds of monomers, practically every intermediate degree between self-adhering and brittle-hard films can be realized. In practice, of course, demands are made on film properties which cannot be realized concurrently with a specified adjustment of hardness. An important requirement is that for a low minimum film forming temperature: The dispersion should dry to form closed films at a temperature as low as possible, preferably at room temperature or even significantly lower. The block point, that is the temperature at which parts of the same film adhere to one another, as a exile is only a little above the minimum film forming temperature. Even in cases in which the film surfaces do not come in contact with one another, this leads to disadvantageous properties such as the adherence of dust and dirt and to mechanical sensitivity already at room temperature or only a little above, for example at 30° C.

Accordingly, the problem presented is in F-L narrower sense to increase the temperature difference between the minimum film forming temperature and the block point, for example to 40 degrees whereas this difference for films of conventional synthetic resin dispersions is from 10 to 20 degrees. At the same time, the film hardness should be increased in comparison with films of conventional dispersions of the same minimum film forming temperature.

It has been found that this problem can be solved if the synthetic resin dispersion is synthesized according to the core-shell-principle and the latex particles consist of a) 5 to 45 weight-% of a core material having a dynamic glass transition temperature above 60° C. and b) 95 to 55 weight-% of a core material having a dynamic glass transition temperature below 80° C., the dynamic glass transition temperature of the shell is at least 20 K. below that of the core and the particles have an average diameter below 140 nm. The effect achieved by the invention suggests the hypothesis that the latex particles are built up of a spherical core and a spherical shell arranged concentrically thereabout. On this point, it has not been investigated if all of the dispersions according to the invention are in fact so constructed. The expression "core-shell-principle" thus should encompass, independent of demonstrable morphology, all dispersions in which the polymer components designated as core material and as shell material are created in successive stages of emulsion polymerization.

ADVANTAGES OF THE INVENTION

In film formation, a matrix is formed of the soft shell material of the synthetic resin dispersion, in which the harder cores of the original latex particles are embedded in unaltered form. The average distance of the embedded core particles in the matrix is—under the assumption of uniform particle diameter—about between one half and one complete core diameter. However, this structure of the matrix is insufficient alone to bring about the desired properties. Only at particle diameters of the latex particles below 140 nanometers (nm), particularly in the region from 120 to 40 nm, is a clear increase evident in the temperature difference between the minimum film forming temperature (MFT) and the block point, as is shown in the following Table in a comparison of a conventional emulsion polymer of 49 weight percent butyl acrylate, 47.5 weight percent of methyl methacrylate, and 3.5 weight percent of methacrylic acid with emulsion polymers according to the present invention having the same overall composition (except for the content of cross linking agent) and differing particle diameters, but synthesized from 25 parts of a core material of polymethyl methacrylate and 3.6 parts allyl methacrylate and 75 parts of a shell material of 65.3 weight percent butyl acrylate, 30 weight percent methyl methacrylate, and 4.7 weight percent of methacrylic acid:

|  | Particle diameter (nm) | MFT (°C.) | Block Point (°C.) | Temp. Diff. (Deg.) | E-modulus (MPa) |
| --- | --- | --- | --- | --- | --- |
| Ordinary | 50 | 12 | 30 | 18 | 16 |

| | Particle diameter (nm) | MFT (°C.) | Block Point (°C.) | Temp. Diff. (Deg.) | E-modulus (MPa) |
|---|---|---|---|---|---|
| emulsion polymer Core-Shell | 275 | 0 | 24 | 24 | 1 |
| emulsion polymer | 155 | 0 | 30 | 30 | 2 |
| | 90 | 0 | 35 | 35 | 10 |
| | 55 | 0 | 40 | 40 | 16 |

The increase in the temperature difference to values of 24 to 40 Kelvin degrees signifies a detectible improvement in film properties. To be sure, it is not unexpected that the minimum film forming temperature decreases as a result of the softer shell material, but it was not predictable that at the same time the temperature difference from the block point increases and that the latter is clearly higher at particle diameters below 140 nm than in conventional emulsion polymers. The low minimum film forming temperature permits the use of the synthetic resin dispersion as binders in coating agents down to the freezing point, while at the same time the temperature at which the disadvantageous results of blocking and soiling of the films formed are to be feared is clearly raised.

Surprisingly, the hardness of the films is also strongly influenced by the particle size of the latex particles. If the particles are too large, then the films formed are too soft for many purposes. As is evident from the foregoing Table, the E-modulus of such films is quite low. Only if the particle size is reduced below 140 nm, preferably below 120 nm, and particularly below 100 nm, does the E-modulus clearly increase and reaches or exceeds the E-modulus of a film of an emulsion polymer of the same overall composition. In the example considered, the increase is more than an order of magnitude. In comparison with an emulsion polymer prepared in a single stage having a composition corresponding to the shell material of an emulsion polymer according to the invention, the E-modulus of a film of the synthetic resin dispersion according to the invention is in typical cases greater by at least a factor of 10 and is at least 5 MPa (1 MPa = 1 Mega-Pascal = $10^6$ Pascal = 10 Kp/cm$^2$). In contrast, if the highest permissible particle size of 140 nm is exceeded, then the E-modulus decreases drastically and scarcely reaches more than twice the value of the corresponding one-stage emulsion polymer.

The extension at break of films of synthetic resin dispersions according to the invention is comparable to or higher than that of films of synthetic resin dispersions of the same overall composition prepared in one stage.

The essential advantage of the new synthetic resin dispersions is that they give films and coatings which at a comparable minimum film forming temperature exceed the hardness and the block point of films and coatings from the usual synthetic resin dispersions.

USE OF THE NEW SYNTHETIC RESIN DISPERSIONS

Because of their low film forming temperatures, the synthetic resin dispersions according to the invention are particularly adaptable to uses in which film formation is desired at temperatures from the freezing point to the region of room temperature or at slightly elevated temperatures up to about 50° C., although preferably below this. In order to increase the block point still further, the minimum film forming temperature can optionally be increased above this region.

Typical fields of use are, thus, as binders for aqueous coating agents in the use of which the film formed from the synthetic resin dispersion adhesively bonds to the substrate, above all interior and exterior paints for buildings. Also, industrial coatings should be mentioned, particularly to the extent that, in their use, elevated temperatures are not reached, or only with difficulty. Examples of such coatings are final coatings, adhesion primers, insulation, and heat-sealable adhesive layers. Further, the dispersions according to the invention are suitable for bonding planar fibrous structures. While films of the pure synthetic resin dispersions are suitable for the last-mentioned purpose, they are as a rule pigmented or combined in other ways with fillers for use in the coating and painting sectors. For this, the usual recipes and formulations are used, in which the advantage of a high block point at high film elasticity and low tackiness and tendency to soiling always are retained. Of course, cases can also be envisioned in which the film is removed from the substrate on which it is formed and is used as a self-supporting film in other areas of technology.

PREPARATION OF THE SYNTHETIC RESIN DISPERSIONS

Preparation of the dispersions takes place by at least two stage free radical emulsion polymerization in aqueous phase, whereby the core material is produced in the first stage and the shell in the second or last stage.

In the first stage, the particles are formed which in the second stage grow further to their final size. After conclusion of the first stage, as a rule no or few new particles are formed.

The average particle diameter is controlled in a known way by the number of the latex particles which arise. As a rule, all particles are formed already at the beginning of the first stage. The concentration of the emulsifying agent in the beginning phase of the emulsion polymerization thus has a decisive influence on the number of particles and, therewith, on the particle size. As soon as the originally formed latex particles begin to grow, they adsorb the available emulsifier on their rapidly growing surface so that new growth nuclei are no longer formed. Conventionally, further emulsifying agent is added during the course of the emulsion polymerization in order sufficiently to cover the newly created polymer surface with emulsifier. However, in this, an increase of the concentration of free emulsifying agent above the critical micelle-forming concentration at any point in time after the particle formation phase should be avoided as much as possible. The available monomer or monomer mixture is then exclusively used for the growth of the original nuclei.

The relationship of the aqueous phase to the total amount of the monomer used in both stages is chosen corresponding to the desired solids content of the synthetic resin dispersion to be prepared; it is mostly between 30 and 60 weight percent. The monomer or monomer mixture for the first stage can be totally initially present in the polymerization vessel in the form of an aqueous emulsion or can be totally added to the vessel during the course of the first stage. Alternatively, a part of the monomer or monomer mixture may be initially present in the vessel, the remaining part being added during the course of the first state. After its polymerization, the monomer or the monomer mixture for the second stage is added all at once or gradually and is also polymerized. The polymerization in both stages is initiated with conventional free radical initiators such as alkali metal or ammonium peroxidisulfate, azo-bis-isobutyronitrile, 4,4'-azo-biscyanovalerianic acid, tert.-butylperpivalate or tert.-butyl hydroperoxide. For formation of a redox system, reducing compounds can be added together with the peroxidic initiators, for example sodium pyrosulfite, sodium hydroxymethyl sulfinate, or ascorbic acid, optionally in combination with heavy metal salts such as iron-II-sulfate. The polymerization temperature as a rule is between 20° and 90° C. and is maintained by cooling of the batch.

As emulsifiers, the conventional water soluble emulsifiers of the anionic, cationic, or nonionic type are suitable. Since the synthetic resin dispersions of the invention contain very small particles, a great number of nuclei must be formed in the initial phase and a corresponding high concentration of emulsifier must be employed. The suitable amount of emulsifier for a given polymerization system is determined by initial tests in which one proceeds from a conventional amount of emulsifier, for example 1 weight percent calculated on the water phase and, if the number of particles which is formed is too large or too small, the amount of emulsifier in the next initial test is increased or decreased. Further, measures for influencing particle size are known to those skilled in the art: cf. Suetterlin, Kurth, Markert in "Makromolekulare Chemie:, 177 (1976), p. 1549-1565.

The term "particle size" is here to be understood as the weight average value of the particle diameter. It can be determined using known methods, for example by turbidity or light-scattering measurements. The method of photon-correlation spectroscopy is particularly suitable. The particle size should be below 140 nm, preferably below 120 nm, and particularly below 100 nm. In most advantageous results are achieved in the region from 50 to 100 nm. The particle size distribution is preferably narrow; the non-uniformity, U, of the particle size should be below 5, preferably below 2; The value is derived from the weight average- and number average-value of the particle size, $d_w$ and $d_N$, according to the formula. $U = d_w^3/d_N^3 - 1$.

Synthesis of the Core- and Shell- Materials

The core material, which is formed in the first polymerization stage, is characterized by a dynamic glass transition temperature above 90° C., preferable 90° to 180° C. The dynamic glass transition temperature is also designated as $T_{g(dyn)}$ or as $T$-$\lambda_{max}$ and can be measured in a film of the polymer in the torsion pendulum test according to DIN 53 445. In the synthesis of the core material, monomers contributing hardness are predominantly used; these are understood to be monomers the homopolymers of which have a dynamic glass transition temperature of at least 60° C., e.g. styrene; α-methyl styrene; acrylonitrile and methacrylonitrile; methyl-, ethyl-, isopropyl, sec. butyl-, and cyclohexyl-methacrylate; vinyl chloride; vinylidene chloride;, or ethylene. Cross linking comonomers having two or more (2-6) polymerizable carbon double bonds in the molecule, such as vinyl-or allyl- acrylate or - methacrylate; diol-diacrylates and -methacrylates; methylene-bisacrylamide or -methacrylamide can be used in conventional small amounts, e.g. 0.01 to 5 weight percent, but these kinds of additives mostly have no considerable influence on the product properties discussed here, such as minimum film forming temperature, film hardness or tackiness, or on the block point. Their amount can, thus, be raised to 20 weight percent or more without disadvantage for the final product.

As further comonomers, if desired, for example acrylamide and/or methacrylamide, their N-alkyl derivatives, methylol compounds and methylol ethers, hydroxyalkyl esters of acrylic acid and/or of methacrylic acid, as well as ethylenically unsaturated, free radically polymerizable carboxylic acids such as acrylic acid, methacrylic acid, maleic acid, fumaric acid, or itaconic acid can be used in amounts up to 20 wt-% of the total weight of the monomers of the first stage.

The core material is from 5 to 45 weight percent of the total emulsion polymer and, consequently, also an equally large fraction of the monomer mixture totally employed. Preferably the amount of the core material is 10–40-%.

The shell material correspondingly is 95 to 55, preferably 90 to 60 weight percent, of the emulsion polymer or the monomer mixture. For the shell material, a dynamic glass transition temperature below 80° C., preferably below 60° C., particularly from 0° to 35° C., is characteristic. It is at least 20, preferably more than 50, in many cases more than 100 centigrade degrees below that of the core material. The shell material is composed to a considerable degree of monomers imparting softness, i.e. such whose homopolymers have dynamic glass transition temperatures below 60° C. The most important examples of such monomers are the alkyl esters of acrylic acid, particularly the $C_1$-$C_8$-alkyl esters. The higher alkyl esters (having 4 to 20 C-atoms) of methacrylic acid; vinyl-alkyl ethers; vinyl acetate; vinyl versatate; and olefins are also suitable. So long as the shell material in total has a glass transition temperature in the required range, monomers contributing hardness can also be included in its synthesis.

This is correspondingly true also for a possible amount of softening monomer in the core material. Also in the second stage, small amounts of unsaturated polymerizable carboxylic acids such as acrylic, methacrylic, itaconic, maleic, or fumaric acid can be involved, preferably in amounts from 0.5 to 10, particularly from 0.5 to 5 weight percent.

Preferred synthetic resin dispersions according to the invention are predominantly, particularly to 70 to 100 weight percent, composed of alkyl esters of acrylic acid and of methacrylic acid, acrylonitrile or methacrylonitrile, styrene, or α-methyl styrene in the core material as well as in the shell material. Cross linking types of these dispersions can contain about 1 to 10 weight percent of methylol-acrylamide or—methacrylamide, or alkyl ethers thereof, optionally together with acrylamide or methacrylamide.

The weight average molecular weight of the core polymer is, to the extent it is not cross linked, above 10000, preferably between 100,000 and 2 million, while that of the shell polymer is over 10000, preferably above 100,000, particularly above 300,000.

In case it is desired, substances effecting cross linking can be added to the dispersion. Such additives, for example oligomeric aziridines or epoxides having at least two functional groups per molecule or urea- or melamine resin-precondensates, or cross linking metal ions such as $Zn^{2+}$—salts, are known to those skilled in the art, as well as—in a particular case—the corresponding co-reactive groups in the emulsion polymer, such as, for example, carboxyl-, hydroxyl-, amide-, or methylolamide groups. The amount of such additives as a rule is below 10% calculated on the dispersion solids; for the most part it is 0-5%.

A better understanding of the invention and of its many advantages will be had by referring to the following specific examples, given by way of illustration.

EXAMPLES

In the following Examples, the sodium salt of the sulfated addition product of 7 moles of ethylene oxide on 1 mole of triisobutyl-phenol is always used as the emulsifier and ammonium peroxide is always used as the initiator. The weight relationship of core material to shell material is in each case 25:75, with the exception of Examples 5 and 9 where it is 40:60 or 20:80.

In every case, the emulsion polymerization is carried out in a Witt vessel of 2 liter capacity equipped with stirrer and external heating or cooling bath. For every batch, an aqueous solution of the emulsifier is present in the reactor and is heated to 80° C. Then, 0.54 g of ammonium peroxydisulfate is added and, if nothing else is supplied, Emulsion I is added dropwise within an hoar and, subsequently, Emulsion II is added dropwise within three hours. In this way the temperature of the batch is maintained in the region from 80° to 100° C. After cooling to room temperature, the pH is adjusted to 9 with aqueous ammonia.

EXAMPLE 1

| | |
|---|---|
| Initial contents | 638.0 g water |
| of vessel | 16.2 g emulsifier |
| Emulsion I | 110 g water |
| | 0.4 g emulsifier |
| | 173.5 g methyl methacrylate |
| | 6.5 g allyl methacrylate |
| Emulsion II | 329 g water |
| | 1.22 g emulsifier |
| | 1.62 g initiator |
| | 356.2 g butyl acrylate |
| | 162 g methyl methacrylate |
| | 25.4 g methacrylic acid |

Solids content of the dispersion obtained: 39 weight percent

Viscosity: 110 mPa s (1 mPa s=1 milli-Pascal-second=1 centiPoise)

Particle size: 90 nm

Dynamic glass transition temperature: Core 130°-135° C.; shell 15° C.

EXAMPLE 2

| | |
|---|---|
| Initial contents | 764 g water |
| of vessel | 32.4 g emulsifier |
| Emulsion I | 132 g water |
| | 0.4 g emulsifier |
| | 130.1 g methyl methacrylate |
| | 4.9 g allyl methacrylate |
| Emulsion II | 395 g water |
| | 1.22 g emulsifier |
| | 1.62 g initiator |
| | 264.5 g butyl acrylate |
| | 121.5 g methyl methacrylate |
| | 19.0 g methacrylic acid |

Solids contents of the dispersion obtained: 29 weight percent

Viscosity: 11 mPa s

Particle size: 55 nm

Dynamic glass transition temperature: Core 130°-135° C.; shell 15° C.

EXAMPLE 3

Initial contents of vessel and Emulsion II as in Example 1.

| | |
|---|---|
| Emulsion I | 100 g water |
| | 0.4 g emulsifier |
| | 180.0 g methyl methacrylate |

Solids content of the dispersion obtained: 39 weight percent

Viscosity: 850 mPa s

Particle size: 80 nm

Dynamic glass transition temperature: Core 130°-135° C.; shell 15° C.

EXAMPLE 4

Initial contents of vessel and Emulsion II as in Example 1.

| | |
|---|---|
| Emulsion II | 110 g water |
| | 0.4 g emulsifier |
| | 179.1 g methyl methacrylate |
| | 0.9 g glycol dimethacrylate |

Solids content of the dispersion obtained: 39 weight percent

Viscosity: 1575 mPa s

Particle size: 75 nm

Dynamic glass transition temperature: Core 130°-135° C.; shell 15° C.

EXAMPLE 5

| | |
|---|---|
| Initial contents | 638 g water |
| of vessel | 16.2 g emulsifier |
| Emulsion I | 162 g water |
| | 0.65 g emulsifier |
| | 277.6 g methyl methacrylate |
| | 10.4 g allyl methacrylate |
| Duration of addition: | 96 minutes |
| Emulsion II | 267 g water |
| | 0.97 g emulsifier |
| | 1.62 g initiator |
| | 282.1 g butyl acrylate |
| | 129.6 g methyl methacrylate |
| | 20.3 g methacrylic acid |

Duration of addition: 144 minutes

Solids content of the dispersion obtained: 39 weight percent

Viscosity: 32 mPa s

Particle size: 100 nm

Dynamic glass transition temperature: Core 130-135° C. shell 15° C.

EXAMPLE 6

Initial contents of vessel and Emulsion I as in Example 1.

| | |
|---|---|
| Emulsion II | 329 g water |
| | 1.22 g emulsifier |
| | 1.62 g initiator |
| | 309.4 g butyl acrylate |
| | 205.2 g methyl methacrylate |

-continued

| | |
|---|---|
| | 25.4 g methacrylic acid |

Solids content of the dispersion obtained: 40 weight percent
  Viscosity 80,000 mPa s
  Particle size: 55 nm
  Dynamic glass transition temperature: Core 130°–135° C.; shell 21° C.

EXAMPLE 7

Initial contents of vessel and Emulsion I as in Example 1.

| | |
|---|---|
| Emulsion II | 329 g water |
| | 1.22 g emulsifier |
| | 1.62 g initiator |
| | 271.6 g butyl acrylate |
| | 243.0 g methyl methacrylate |
| | 25.4 g methacrylic acid |
| | 1.62 g 2-ethylhexylthioglycolate |

Solids content of the dispersion obtained: 39 weight percent
  Viscosity: 4400 mPa s
  Particle size: 65 nm
  Dynamic glass transition temperature: Core 130°–135° C.; shell 32° C.

COMPARISON EXAMPLE 1

| | |
|---|---|
| Initial contents of vessel | 638 g water |
| | 16.2 g emulsifier |
| Emulsion | 444 g water |
| | 1.62 g emulsifier |
| | 1.62 g initiator |
| | 352.8 g butyl methacrylate |
| | 342 g methyl methacrylate |
| | 25.2 g methacrylic acid |

Duration of addition: 4 hours. After cooling, pH adjusted to 9 with aqueous ammonia.
Solids content of the dispersion obtained: 40 weight percent
  Viscosity: 36,000 mPa s
  Particle size: 50 nm
  Dynamic glass transition temperature: 33° C.

COMPARISON EXAMPLE 2

| | |
|---|---|
| Initial contents of vessel | 638 g water |
| | 0.16 g initiator |
| | 0.27 g emulsifier |
| Emulsion I | 110 g water |
| | 4.0 g emulsifier |
| | 173.5 g methyl methacrylate |
| | 6.5 g allyl methacrylate |
| Emulsion II | 329 g water |
| | 12.2 g emulsifier |
| | 1.62 g initiator |
| | 352.6 g butyl acrylate |
| | 162 g methyl methacrylate |
| | 25.4 g methacrylic acid |

Solids contents of the dispersion obtained: 39 weight percent
  Viscosity: 205 mPa s
  Particle size: 155 nm
  Dynamic Glass transition temperature: Core 130°–135° C., shell 15° C.

COMPARISON EXAMPLE 3

| | |
|---|---|
| Initial contents of vessel | 638 g water |
| | 0.05 g emulsifier |
| Emulsion I | 110 g water |
| | 4.0 g emulsifier |
| | 173.5 g methyl methacrylate |
| | 6.5 g allyl methacrylate |
| Emulsion II | 329 g water |
| | 12.2 g emulsifier |
| | 1.62 g initiator |
| | 352.6 g butyl acrylate |
| | 162 g methyl methacrylate |
| | 25.4 g methacrylic acid |

Solids content of the dispersion obtained: 39 weight percent
  Viscosity: 19 mPa s
  Particle size: 275 nm
  Dynamic glass transition temperature: Core 130°–135° C.; shell 15° C.

COMPARISON EXAMPLE 4

Initial contents of vessel and Emulsion II as in Comparison Example 2.

| | |
|---|---|
| Emulsion I | 110 g water |
| | 4.0 g emulsifier |
| | 180.0 g methyl methacrylate |

Solids content of the dispersion obtained: 38 weight percent
  Viscosity: 875 mPa s
  Particle size: 160 nm
  Dynamic glass transition temperature: Core 130°–135° C.; shell 15° C.

COMPARISON EXAMPLE 5

Initial contents of vessel and Emulsion II as in comparison Example 3.

| | |
|---|---|
| Emulsion I | 110 g water |
| | 4.0 g emulsifier |
| | 180.0 g methyl methacrylate |

Solids content of the dispersion obtained: 39 weight percent
  Viscosity: 60 mPa s
  Particle size: 225 nm
  Dynamic glass transition temperature: Core 130°–135° C.; shell 15° C.

COMPARISON EXAMPLE 6

Initial contents of vessel and Emulsion I as in comparison Example 2.

| | |
|---|---|
| Emulsion II | 329 g water |
| | 12.2 g emulsifier |
| | 1.62 g initiator |
| | 309.4 g butyl acrylate |
| | 205.2 g methyl methacrylate |
| | 25.4 g methacrylic acid |

Solids content of the dispersion obtained: 39 weight percent

Viscosity: 480 mPa s
Particle size: 170 nm
Dynamic glass transition temperature: Core 130°–135° C.; shell 21° C.

COMPARISON EXAMPLE 7

Initial contents of vessel and Emulsion I as in Comparison Example 3.

| Emulsion II | 329 g water |
|---|---|
| | 12.2 g emulsifier |
| | 1.62 g initiator |
| | 309.4 g butyl acrylate |
| | 205.2 g methyl methacrylate |
| | 25.4 g methacrylic acid |

Solids content of the dispersion obtained: 39 weight percent
Viscosity: 22 mPa s
Particle size: 280 nm
Dynamic glass transition temperature: Core 130°–135° C.; shell 21° C.

COMPARISON EXAMPLE 8

| Initial contents | 638 g water |
|---|---|
| of vessel | 16.2 g initiator |
| Emulsion | 706 g water |
| | 1.62 g emulsifier |
| | 1.62 g initiator |
| | 412.6 g butyl methacrylate |
| | 273.6 g methyl methacrylate |
| | 33.8 g methacrylic acid |

Duration of addition: 4 hours. After cooling, the pH was adjusted to 9 with aqueous ammonia.
Solids content of the dispersion obtained: 35 weight percent
Viscosity: 46,000 mPa s
Particle size: 50 nm
Dynamic glass transition temperature: 21° C.

Properties of the emulsion polymers or films according to Examples 1–7 and Comparison Examples 1–8:

hours at 60° C. A 25×170 mm strip of the coated paper is folded along the middle of its width with the coated side inward and then kept between two plane surfaces under a load of 5000 Pascals with step-wise increase of the temperature in increments of 5° K. The block point is the lowest temperature at which the surface of the coating film, after loading, is noticeably damaged upon pulling apart the folded strip.

EXAMPLE 8

Initial contents of vessel as in Example 1.

| Emulsion I | 118 g water |
|---|---|
| | 0.4 g emulsifier |
| | 173.52 g methyl methacrylate |
| | 6.48 g allyl methacrylate |
| Emulsion II | 330 g water |
| | 1.22 g emulsifier |
| | 1.22 g initiator |
| | 399.0 g butyl acrylate |
| | 118.8 g methyl methacrylate |
| | 25.38 g methacrylic acid |

Solids content of the dispersion obtained: 39 weight percent
pH value: 9
Viscosity: 86 mPa s
Particle size: 84 nm

EXAMPLE 9

Initial contents of vessel as in Example 1.

| Emulsion I | 94 g water |
|---|---|
| | 0.32 g initiator |
| | 0.33 g emulsifier |
| | 136.8 g methyl methacrylate |
| | 7.2 g allyl methacrylate |
| Duration of addition: | 48 minutes |
| Emulsion II | 353 g water |
| | 1.3 g initiator |
| | 1.3 g emulsifier |
| | 506.88 g ethyl acrylate |
| | 57.6 g butyl acrylate |
| | 11.52 g methacrylic acid |

| Ex. No. | Composition Core/Shell (Wt. percent) | | | | | Particle Size (nm) | MFT (°C.) | Block Point (°C.) | Block Point-MFT (°C.) | E-Modulus (MPa) | Extension at Break (Percent) |
|---|---|---|---|---|---|---|---|---|---|---|---|
| | MMA | ALM | BA | MMA | MAA | | | | | | |
| 1 | 96.4 | 3.6 | 65.3 | 30 | 4.7 | 90 | 0 | 35 | 35 | 16 | 275 |
| 2 | 96.4 | 3.6 | 65.3 | 30 | 4.7 | 55 | 0 | 40 | 40 | 16 | 261 |
| 3 | 100 | — | 65.3 | 30 | 4.7 | 80 | 0 | 40 | 40 | 30 | 396 |
| 4 | 99.5 | 0.5* | 65.3 | 30 | 4.7 | 75 | 0 | 40 | 40 | 27 | 419 |
| 5 | 96.4 | 3.6 | 65.3 | 30 | 4.7 | 100 | 25 | 50 | 25 | 104 | 32 |
| 6 | 96.4 | 3.6 | 57.3 | 38 | 4.7 | 55 | 12 | 55 | 43 | 45 | 221 |
| 7 | 96.4 | 3.6 | 50.3 | 45 | 4.7 | 65 | 21 | 45 | 24 | 123 | 68 |
| COMPARISON EXAMPLES | | | | | | | | | | | |
| 1 | — | — | 49.0 | 47.5 | 3.5 | 50 | 12 | 30 | 18 | 16 | 357 |
| 2 | 96.4 | 3.6 | 65.3 | 30 | 4.7 | 155 | 0 | 30 | 30 | 2 | 1022 |
| 3 | 96.4 | 3.6 | 65.3 | 30 | 3.7 | 275 | 0 | 24 | 24 | 1 | 1618 |
| 4 | 100 | — | 65.3 | 30 | 4.7 | 160 | 0 | <24 | <24 | 1 | 588 |
| 5 | 100 | — | 65.3 | 30 | 4.7 | 225 | 0 | <24 | <24 | 1 | 929 |
| 6 | 96.4 | 3.6 | 57.3 | 38 | 4.7 | 170 | 5 | 45 | 40 | 4 | 244 |
| 7 | 96.4 | 3.6 | 57.3 | 38 | 4.7 | 280 | 4 | 40 | 36 | 3 | 326 |
| 8 | — | — | 57.3 | 38 | 4.7 | 50 | 0 | <24 | <24 | 2 | 687 |

MMA = Methyl methacrylate
ALM = Allyl methacrylate
BA = Butyl Acrylate
MAA = Methacrylic acid
MFT = Minimum Film-forming Temperature
*Ethylene glycol dimethacrylate Determination of the block point: The dispersion is applied with a rake having a height between the tines of 0.2 mm to a weakly absorbent paper and dried for 3

Duration of addition: 192 minutes

The dispersion was subsequently stabilized with 21.6 g of an oxyalkylated tert.-octylphenol ("Triton X 305") and adjusted to pH 9 with aqueous ammonia. The core/shell ratio was 20:80 parts by weight.

Solids content of the dispersion obtained: 40.1 weight percent

Viscosity: 61 mPa s

Particle size: 66 nm

What is claimed is:

1. An aqueous synthetic resin dispersion containing latex particles having an average particle diameter less than 100 nanometers, said particles consisting of
   a) 5 to 45 percent, by weight of said particles, of a core polymer comprising at least one necessary monomer selected from the group consisting of methyl methacrylate, styrene, alkyl esters of acrylic acid, and higher alkyl esters of methacrylic acid, such that the dynamic glass transition temperature of said core copolymer is above 60° C., and
   b) 95 to 55 percent, by weight of said particles, of a shell polymer comprising at least one of said necessary monomers, and, further, 0.5 to 10 percent, by weight of the shell polymer, of an unsaturated polymerizable carboxylic acid such that the dynamic glass transition temperature of said shell polymer is below 35° C.,
   wherein said necessary monomers together form at least 75 percent by weight of said polymers and wherein the dynamic glass transition temperature of the shell polymer is at least 20 centigrade degrees below that of the core polymer.

2. An aqueous synthetic resin dispersion as in claim 1 having a minimum film forming temperature below 50° C.

3. An aqueous synthetic resin dispersion as in claim 1 which forms a film having an E-modulus of at least 5 Mega-Pascals.

4. An aqueous synthetic resin dispersion containing latex particles having an average particle diameter less than 100 nanometers, said particles consisting of
   a) 5 to 45 percent, by weight of said particles, of a core polymer comprising at least one necessary monomer selected from the group consisting of methyl methacrylate, styrene, alkyl esters of acrylic acid, and higher alkyl esters of methacrylic acid, and, further, 0.1 to 5 percent, by weight of the core polymer, of at least one crosslinking monomer having two or more polymerizable carbon-carbon double bonds in the molecule, such that the dynamic glass transition temperature of said core polymer is above 60° C., and
   b) 95 to 55 percent, by weight of said particles, of a shell polymer comprising at least one of said necessary monomers such that the dynamic glass transition temperature of said shell polymer is below 35° C.,
   wherein said necessary monomers together form at least 75 percent by weight of said polymers and wherein the dynamic glass transition temperature of the shell polymer is at least 20 centigrade degrees below that of the core polymer.

5. An aqueous synthetic resin dispersion as in claim 4 having a minimum film forming temperature below 50° C.

6. An aqueous synthetic resin dispersion as in claim 4 which forms a film having an E-modulus of at least 5 Mega-Pascals.

7. An aqueous synthetic resin dispersion containing latex particles having an average particle diameter less than 100 nanometers, said particles consisting of
   a) 5 to 45 percent, by weight of said particles, of a core polymer comprising at least one necessary monomer selected from the group consisting of methyl methacrylate, styrene, alkyl esters of acrylic acid, and higher alkyl esters of methacrylic acid, and, further, 0.1 to 5 percent, by weight of the core polymer, of at least one crosslinking monomer having two or more polymerizable carbon-carbon double bonds in the molecule, such that the dynamic glass transition temperature of said core polymer is above 60° C., and
   b) 95 to 55 percent, of the total weight of said particles, of a shell polymer comprising at least one of said necessary monomers, and, further, 0.5 to 10 percent, by weight of the shell polymer, of an unsaturated polymerizable carboxylic acid, such that the dynamic glass transition temperature of said shell polymer is below 35° C.,
   wherein said necessary monomers together form at least 75 percent by weight of said polymers and wherein the dynamic glass transition temperature of the shell polymer is at least 20 centigrade degrees below that of the core polymer.

8. An aqueous synthetic resin dispersion as in claim 7 having a minimum film forming temperature below 50° C.

9. An aqueous synthetic resin dispersion as in claim 7 which forms a film having an E-modulus of at least 5 Mega-Pascals.

* * * * *